Patented Sept. 15, 1953

2,652,373

UNITED STATES PATENT OFFICE 2,652,373

COMPOSITION OF MATTER WITH PLASTIC BONDING AND METHOD OF MAKING FROM CRESOL-FORMALDEHYDE, COMMINUTED WOOD, AND SODIUM SILICATE

Souren Z. Avedikian, Larchmont, N. Y.

No Drawing. Application April 29, 1950, Serial No. 159,148

3 Claims. (Cl. 260—17.2)

Large amounts of saw dust, shavings, slabs, stumps and other waste products are by-products of the lumber industry, and various plans have been devised for converting these low-cost wood products into useful building material. Although the waste material used is of low cost, the building materials made from it have been of much higher cost, partly because of the plastic binders used, but also because of the processes used in the manufacture.

It is an object of this invention to provide an improved molded product made from the low-cost waste products of the lumber industry, and to make the product in such a way that it is of substantially lower cost than comparable products of the prior art, thus obtaining full advantage of the initial low cost of the principal raw material used.

Although this invention is intended primarily for panels, flooring, for example underlay, parquet type, as well as for roofing, shingles, siding and other items used in the building industry, it can also be used for various molded products and in its broader aspects it can be used for making molded products at lower cost from comminuted material other than waste wood products, for example, iron filings and asbestos. It may be said that in its broadest scope, it is an object of this invention to provide an improved molded product of comminuted material and plastic resin and an improved process for making such a product.

The usual practice in molding is to employ molding powders or liquid mixtures which have been prepared by partially reacting selected raw materials. Instead of following this practice, the process of my invention mixes the selected raw material for bonding directly into the wood waste or other comminuted material so that all of the reaction between the raw materials that make the bond can be made to occur in the complete mixture of ingredients from which the final product of the invention is made. This effects a saving in the cost of material by eliminating the use of partially prepared material on which labor and equipment time has already been invested and it effects additional savings in manufacturing costs by making possible the production of the molded products in a single mixing and a single molding operation.

Other features of the invention relate to the chemicals used. In the preferred embodiment a mixture of meta- and para-cresols, together with some ortho-cresol, are used where it was formerly thought necessary to utilize the more costly redistilled meta-cresol in order to obtain the best results.

Another feature of the preferred embodiment relates to the catalyst used in reacting a phenolic compound with an aldehyde. Meta, ortho, or sesqui-silicates are used. Sodium sesqui-silicate (preferably anhydrous) seems to give the best results. These improved catalysts have the advantage that they remain in the molded product and serve to reduce its flammability.

The invention will be described as applied to saw dust or finely divided wood shavings, it being understood that features of the invention can be used with other fibrous and/or comminuted material which is capable of being compacted or molded.

In preparing the composition of matter, utilizing sawdust as a principal ingredient, in accordance with this invention, the sawdust is used with a moisture content of 10% or less. A solution consisting of a phenolic compound and an aldehyde are mixed with the sawdust by stirring or tumbling, or the solution of the phenolic compound and aldehyde may be sprayed on the sawdust, the object being to obtain as uniform a distribution as possible of the solution in the saw dust.

In the preferred mixture of this invention, 21 parts of meta-para-cresol are dissolved in 18 parts of formaldehyde comprising a commercial aqueous solution of 37% concentration. This is an excess of formaldehyde over what is required for an equimolecular mixture, but in practice it is desirable to have a slight excess of formaldehyde, for example, 5-20% over the theoretical equimolecular proportions. As much as 39% excess has been used without adverse effects. This solution is added to and mixed uniformly with 158 parts of sawdust and 6 parts of sodium sesqui-silicate are then distributed through the mixture. All references herein to proportions are by weight.

The combined ingredients are then formed to the shape desired for the finished product, preferably by placing the mixture in a mold in which it is subjected to heat. A temperature of the order of from 120 to 180° C. gives good results, the higher temperatures producing a denser product. The density of the product can also be increased by application of pressure to the material during the reaction period. Good results have been obtained with pressures up to 600 pounds per square inch, denser products being obtained by using higher pressures. Instead of using a mold to form the material, one or more rolls with suitable conveying means can be employed for making sheets or boards, the forming being carried out either before or during the reaction period.

The purpose of the heating step is to react the phenolic compound and the aldehyde completely so as to obtain a resit condensation product. The time required depends upon the thickness of the mass and the temperature of the mold. It may vary between 2½ and 10 minutes, depending upon conditions. It is possible to tell whether the reaction has gone to completion and formed a resit by observing the product when taken from the mold. If the reaction is incomplete, the product will be thermoplastic, and since it is taken from the mold hot, it will be soft when the mold is opened. If the reaction has gone to completeness and formed a resit, the product will be hard.

An alkaline catalyst seems to be necessary in order to have the condensation polymerization of the phenol and aldehyde progress to completion and produce a resit. In addition to the advantage of having a final product that remains hard even when exposed to relatively high temperatures, important economies in manufacture are obtained by ejecting the product from the mold while hot as compared with earlier processes in which molded products were thermoplastic, because the condensation polymerization was not carried to the final infusible, resit stage and had to be retained in the molds and under pressure while they cooled. In addition to the machine time lost by holding the product in the mold while it cools, the cost of operating a mold is enormously increased if the mold has to be reheated for every unit produced.

Phenolic compounds consisting of a mixture of meta- para- and some ortho-cresol are substantially lower in price than meta-cresol from which the para- and ortho-cresol have been separated. The mixed cresols produce completely satisfactory results in the preferred embodiment of this invention provided that the proportion of meta-cresol is not less than the order of 55%. The proportion of ortho-cresol is preferably small, being not greater than the order of 3% and the cresol mixture may contain up to 5% of phenol.

The water absorption of the final product depends upon the amount of plastic used. With 25% of plastic there is substantially no water absorption by the final product. If the percentage of plastic is slightly less than 20%, a water absorption of 5½% will occur with an immersion of 28 hours. The water absorption can be reduced, however, by adding paraffin to the mixture. Small amounts of paraffin of not more than 6 parts in the above formula, with the paraffin pulverized or grated and uniformly distributed in the mixture just before the catalyst is added, reduce the water adsorption and with any of the formulae for the invention, the addition of paraffin makes it possible to obtain a product of any required water absorption characteristics with a smaller amount of plastic. This reduces the cost of the product since paraffin is of lower cost than the plastic materials that are used.

The invention can be used with formaldehyde which is partially polymerized so that it is in solid form. The formaldehyde is powdered and 7 parts of the powdered formaldehyde, having a purity of the order of 94%, is dispersed in 158 parts of saw dust and mixed with 21 parts of the meta-para-cresol used in the other formula above. Six parts of the catalyst are added, as in the other example, and the process is carried out in the same manner as already explained. When dry formaldehyde is used, a higher moisture content in the original saw dust can be tolerated. In practice, a moisture content of the order of 10–15% in the mixture as it goes into the mold, seems to give the best results. If the moisture content is greater than 15%, the mixture can be dried to the desired moisture content.

Another modification in the method by which this invention is carried out, is the addition of water to dilute the meta-para-cresol mixture so as to aid in the more uniform distribution of the cresol mixture, particularly when it is to be distributed by spraying it on the saw dust. The amount of water that can be added depends upon the already existing moisture content of the saw dust, it being kept in mind that the final moisture content of the mixture that goes into the mold should not be more than of the order of 15%.

The cresol mixture is not soluble in water but may be used as a suspension provided it is agitated sufficiently to maintain the suspension. However, an emulsifying agent can be added to the cresol-water mixture. Suitable emulsifying agents are sulphated castor oil fatty acids; triethanolamineoleate; or polymethylene - glycol esters of fatty acids.

In all of the above examples, the amount of catalyst used, which is preferably sodium sesquisilicate, can be varied over a range of the order of from two to considerably more than six parts of catalyst with the proportions of other ingredients given in the above examples, cost factors controlling. Other catalysts can be used, such as sodium ortho- or meta-silicates, borax, and tri-sodium phosphate. These catalysts do not appear to give as good results as sesquisilicate but all of them remain in the molded product and serve to reduce its flammability.

Another alkaline catalyst that can be used, which is lost by vaporization during the molding process, is ammonia. The ammonia can be supplied by mixing with the other ingredients hexamethylenetetramine or ammonium carbonate. Both of these solids decompose under heat to give ammonia which serves as volatile catalyst in the mixture. As it is well known, hexamethylenetetramine is also a source of formaldehyde and when used can serve as partial replacement for the formaldehyde in the formulas cited.

Other phenolic compounds that can be used in place of the cresol given in the above examples are phenol or carbolic acid, 1, 3, 5 xylenol, other xylenols and other higher alkalated phenols, cost factors controlling. In place of formaldehyde, furfuraldehyde can be used, as well as other aldehydes, cost factors controlling.

Another way in which the invention can be used is by mixing the phenolic compound with less aldehyde than needed to produce an equimolecular mix and with an alkaline or acid catalyst so that the reaction of the ingredients present will not proceed to completion. The amount of alkaline or acid catalyst used can be less than the amount of alkaline catalyst in the above examples and may comprise one part or more of tartaric acid or phosphoric acid for the acid catalyst or an equivalent amount of the alkaline catalyst. Such a mixture of a phenolic compound and an aldehyde with the sawdust can be heated to a temperature of the order of 100° C. for a period of about 30 minutes without pressure. The resulting product has the same powdery consistency as the original mixture had before heating, but it can be kept indefinitely and provides a good molding compound which can be put into molds of different sizes and shapes as various products are needed for shipment or inventory. The balance of aldehyde required for an equi-molecular mix is added, together with an alkaline catalyst, before the molding compound is put into the mold to make the final product. It is sufficient to keep the formaldehyde down to 80 or 90% of what is needed for an equimolecular mix. This two-step method does not have the same handling economies in production as the first process described above, but does have convenience advantages where a manufacturer producing a large variety of molded products does not want to carry a large inventory.

The final product obtained by this invention is hard but not brittle. It can be nailed, sawed, drilled, screwed. It is opaque and the surface may be smooth or rough, depending upon the mold used and the ratio of sawdust to the plastic, can be sized and painted or stained or varnished. It can be colored by mixing pigments with the other ingredients at the time the product is being made. Being a resit, the product is not fusible and is not soluble in organic solvents. The product remains hard even when heated.

The preferred embodiments of the invention have been described, but changes and modifications can be made, and some features of the invention can be used alone or in different combinations without departing from the invention as defined in the claims.

I claim as my invention:

1. The method of making a molded composition of matter from waste wood, which method comprises adding to said waste wood, with the latter in comminuted condition, an aldehyde dissolved in a mixture of meta-para-cresols of which at least 55% is meta-cresol, thoroughly mixing the waste wood, aldehyde and cresol mixture, then adding to the mixture a water-soluble alkali metal silicate catalyst, then with the aldehyde and cresol mixture remaining in an unreacted condition, placing the mixed materials in a mold having a temperature of at least 120° C., and reacting the materials under heat and under a pressure of at least 150 pounds per square inch until they produce a resit.

2. The method of making molded synthetic wood board, which method comprises mixing together approximately 158 parts of comminuted wood having a moisture content not more than 10%, with 21 parts of meta-para-cresol mixture which is at least 55% meta-cresol, 18 parts of formaldehyde comprising a commercial aqueous solution of 37% concentration, and then adding to the mix of the order of 6 parts of sodium sesqui-silicate as a catalyst, reacting the mixed materials in a mold at a temperature of the order from 120 to 180° C. and at a pressure between 150 and 600 pounds per square inch, continuing the reaction in the mold until a resit is formed, and then removing the molded product from the mold while hot.

3. The product obtained by the process described in claim 2.

SOUREN Z. AVEDIKIAN.

References Cited in the file of this patent

UNITED STATES PATENTS

| Number | Name | Date |
|---|---|---|
| 949,671 | Baekeland | Feb. 15, 1910 |
| 1,776,366 | Novotny | Sept. 23, 1930 |
| 2,197,724 | Hovey | Apr. 16, 1940 |

FOREIGN PATENTS

| Number | Country | Date |
|---|---|---|
| 545,157 | Great Britain | May 13, 1942 |

OTHER REFERENCES

Baekeland: Ind. and Eng. Chem., March 1909, pp. 149–161.